(12) United States Patent
Dabouineau et al.

(10) Patent No.: US 10,407,335 B2
(45) Date of Patent: Sep. 10, 2019

(54) ULTRASONIC NEAR FIELD HOT GLASS TRANSPORTATION AND FORMING

(71) Applicant: Corning Incorporated, Corning, NY (US)

(72) Inventors: Jean-Luc Dabouineau, Nemours (FR); Albert Roth Nieber, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 72 days.

(21) Appl. No.: 15/522,140

(22) PCT Filed: Nov. 16, 2015

(86) PCT No.: PCT/US2015/060843
§ 371 (c)(1),
(2) Date: Apr. 26, 2017

(87) PCT Pub. No.: WO2016/081353
PCT Pub. Date: May 26, 2016

(65) Prior Publication Data
US 2018/0290912 A1    Oct. 11, 2018

Related U.S. Application Data

(60) Provisional application No. 62/080,571, filed on Nov. 17, 2014.

(51) Int. Cl.
*C03B 23/00* (2006.01)
*C03B 23/035* (2006.01)
(Continued)

(52) U.S. Cl.
CPC .......... *C03B 23/0352* (2013.01); *C03B 13/16* (2013.01); *C03B 13/18* (2013.01);
(Continued)

(58) Field of Classification Search
CPC ................... C03B 23/0073; C03B 23/0352
See application file for complete search history.

(56) References Cited

U.S. PATENT DOCUMENTS

| 4,695,305 A * | 9/1987 | Clasen ................... C03B 19/12 |
| | | 264/434 |
| 7,098,157 B2 | 8/2006 | Funk |
| (Continued) | | |

FOREIGN PATENT DOCUMENTS

| DE | 19857444 A1 | 12/1998 |
| EP | 1685046 B1 | 11/2004 |
| (Continued) | | |

OTHER PUBLICATIONS

International Search Report and Written Opinion of the International Searching Authority; PCT/US2015/060843 dated Feb. 3, 2016.

*Primary Examiner* — Cynthia Szewczyk
(74) *Attorney, Agent, or Firm* — Gregory V. Bean

(57) ABSTRACT

A system for levitating a softened, viscous or viscoelastic material by near field acoustic levitation. The system includes a support structure having a rigid surface, and a vibration generator operatively connected to the rigid surface. The vibration generator transmits acoustic waves to the rigid surface at a frequency and an amplitude sufficient to vibrate the rigid surface and create a gas squeeze film between the material and the rigid surface. The gas squeeze film has a pressure greater than ambient air pressure and sufficient to levitate the material. The system is particularly suited for transporting, forming, or casting heated glass. Also disclosed are methods for transporting, forming, and casting heated glass using near field acoustic levitation.

23 Claims, 12 Drawing Sheets

(51) Int. Cl.
  *C03B 13/16*    (2006.01)
  *C03B 13/18*    (2006.01)
  *C03B 19/02*    (2006.01)
  *C03B 23/023*   (2006.01)
  *F16C 32/06*    (2006.01)
  *G10K 15/00*    (2006.01)
  *G10K 15/04*    (2006.01)

(52) U.S. Cl.
  CPC ............ *C03B 19/02* (2013.01); *C03B 23/023* (2013.01); *C03B 23/0355* (2013.01); *C03B 23/0357* (2013.01); *F16C 32/0611* (2013.01); *G10K 15/00* (2013.01); *G10K 15/04* (2013.01)

(56) References Cited

U.S. PATENT DOCUMENTS

| | | |
|---|---|---|
| 2011/0311320 A1 | 12/2011 | Schilp et al. |
| 2012/0274011 A1 | 11/2012 | Schilip et al. |

FOREIGN PATENT DOCUMENTS

| | | |
|---|---|---|
| JP | 0680429 A | 3/1994 |
| JP | 2000007360 A | 1/2000 |
| JP | 201172029 A | 6/2001 |
| JP | 2002104831 A | 4/2002 |
| JP | 2002137925 A | 5/2002 |
| JP | 2002173328 A | 6/2002 |
| JP | 2003326352 A | 11/2003 |
| JP | 2011256087 A | 12/2011 |
| WO | 2010083813 A1 | 7/2010 |
| WO | 12011009447 A2 | 1/2011 |
| WO | 2011055482 A1 | 5/2011 |

\* cited by examiner

ULTRASONIC NEAR FIELD HOT GLASS TRANSPORTATION AND FORMING

CROSS-REFERENCE TO RELATED APPLICATIONS

This application claims the benefit of priority under 35 U.S.C. § 365 of International Patent Application Serial No. PCT/US15/60843 filed on Nov. 16, 2015 designating the United States of America, which claims the benefit of priority to U.S. Provisional Application Ser. No. 62/080,571 filed on Nov. 17, 2014 the content of which are relied upon and incorporated herein by reference in their entirety.

BACKGROUND

The present technology relates to a method and apparatus for non-contact transporting or shaping softened, viscous, or viscoelastic materials using ultrasonic near field levitation. The method and apparatus are particularly suitable for transporting or shaping hot glass.

Fusion draw processes are used to form sheet materials, such as glass, with pristine surfaces of fire-polished quality. Such sheet materials can be used to make 3D shaped glass parts for products such as, for example, mobile phone covers, automotive windows, and architectural applications. Since the shaped glass parts are used to hold and protect a display, or used as windows, the shaped parts must be pristine and have a perfect optical quality.

Several processes are known in the art for reforming glass sheet into 3D parts. Known processes include pressing, sagging, vacuum forming, pressure forming, and combinations of these techniques. The final shape of the reformed glass is a copy of the forming mold. One drawback of prior art forming processes is that it is difficult to obtain parts that have the necessary pristine surface quality. Surface quality is a function of the cleanliness of the forming environment, and also depends on the glass interaction with a mold during the forming process. Especially at high temperature, when the glass is softer, the glass can cool unevenly when in contact with a colder mold, causing higher stresses and changes in the final shape of the glass. Defects in the glass can also be introduced due to oxidation of the mold, sticking of the glass to the mold, and transfer of machining or tool marks from the mold to the glass. In addition, during the forming processes, the glass needs to be moved from step-to-step, and avoiding damage to the edge or surface as the glass is handled can be a challenge.

Another drawback of the reforming processes is that, as a result of the higher temperature glass contacting the colder mold, the molds can become deformed or damaged. Consequently, the molds have a limited life and have to be prepared and exchanged on a regular basis to limit cosmetic defects in the reformed glass. Having to replace the molds on a regular basis increases the cost of the reforming process.

Avoiding contact with the glass during the transporting and reforming operations is desirable because it may likely limit damage to the glass and to the mold, and also likely increase the life of the mold, thereby reducing cost.

Technologies for non-contact or low-contact transport of objects exist in the art. For example, conveying systems using magnetic forces or air cushions are known and used in the art. Air cushions can be generated by air flowing through nozzles along a conveying plate or a rail. Alternatively, sound waves can be used to generate the air cushions for conveying objects. In such systems, the objects to be conveyed are atop a vibrating surface and have a solid, planar surface. Sound waves emanating from the vibrating surface create a gas squeeze film that generates a levitation force that levitates the object above the vibrating surface. One requirement of known levitation systems is that the object to be levitated must have a hard or solid surface. What is needed in the art is a levitation system that can be used to levitate hot or molten glass, or other viscous materials, such as gums, that do not have a hard or solid surface.

BRIEF SUMMARY

At least one embodiment of the present technology provides a system for levitating a softened, viscous, or viscoelastic material, such as a heated glass, using acoustic waves. The system comprises at least one support structure having a rigid surface, and at least one vibration generator operatively connected to the rigid surface for generating and transmitting acoustic waves from the vibration generator to the rigid surface. The rigid surface vibrates as a result of the acoustic waves, creating a gas squeeze film between the heated glass and the rigid surface that generates a levitation force sufficient to levitate the heated glass so that the glass does not contact the rigid surface. In one aspect, the system is used for non-contact transporting of the heated glass. In another aspect, the system is used for non-contact shaping of the heated glass. In a further aspect, the system is used for non-contact casting of the heated glass.

In another embodiment, the present technology relates to a method of levitating a softened, viscous, or viscoelastic material, such as a heated glass, using acoustic waves. The method comprises (a) providing a support structure having a rigid surface, and a vibration generator operatively connected to the rigid surface, (b) generating and transmitting acoustic waves from the vibration generator to the rigid surface, at a frequency and an amplitude sufficient to vibrate the rigid surface and thereby create a gas squeeze film between the heated glass and the rigid surface, the gas squeeze film having a pressure greater than ambient air pressure, and (c) levitating the heated glass with the pressure generated by the gas squeeze film such that the heated glass does not contact the rigid surface. The method can be used for transporting, shaping or casting heated glass.

Additional features and advantages will be set forth in the detailed description which follows, and in part will be readily apparent to those skilled in the art from that description or recognized by practicing the embodiments as described herein, including the detailed description which follows; the claims; as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
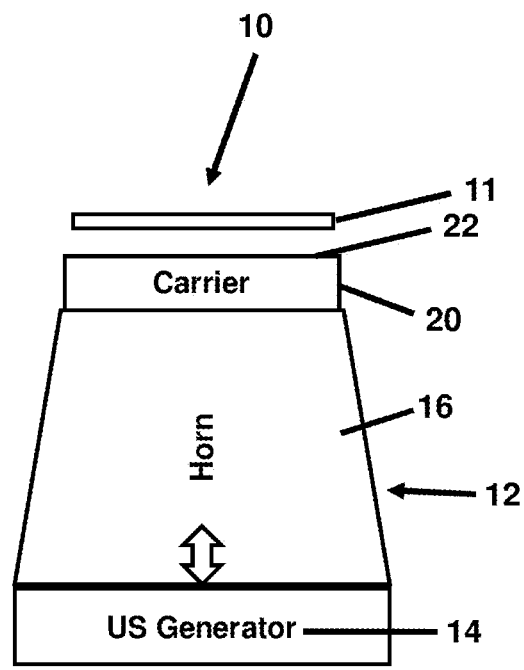
FIG. 1 is a side view of a system for transporting heated glass using near field acoustic levitation.

Reference will now be made in detail to various non-limiting embodiments of the present technology, examples of which are illustrated in the accompanying drawings. Whenever possible, the same reference numerals will be used throughout the drawings to refer to the same or like parts.

FIG. 1 illustrates one embodiment of a system 10 for levitating heated glass using near field acoustic levitation. In this embodiment, the system 10 uses acoustic levitation to transport glass 11, wherein the glass may be heated. By "heated glass" is meant a glass that is at a temperature of equal to or above its glass transition temperature, such as at the deformation point, the dilatometric softening point, the Littleton softening point, the flow point, the working point, or the melting point—i.e., under a condition so that the glass is in a softened, viscous, or viscoelastic state. Heated glass includes molten or hot glass that has not been previously cooled, as well as glass that has undergone a heating step so that it is above the glass transition temperature. It is also contemplated that the glass can be in a preform shape, for example, a thin, flat shape, that is wholly or partly heated either prior to or during levitation.

The system 10 includes a vibration source 12 coupled to a sonotrode 20 having a rigid surface 22. The vibration source 12 includes a transducer 14, which incorporates any suitable transducer element or elements, such as a piezoelectric or magnetostrictive element or elements. The vibration source further includes a booster or acoustic transformer 16 coupled to the transducer 14. In this embodiment, the booster 16 has a truncated cone shape with the base of the cone adjacent to the transducer 14. When energized, for example by supplying an electric current, the transducer 14 generates an acoustic wave that is transmitted to the rigid surface 22 of the sonotrode 20 through the booster 16. The acoustic wave could be vibratory, ultrasonic or megasonic. The booster 16 can maintain the amplitude of the acoustic wave, or alternatively, can increase the amplitude of the acoustic wave that is transmitted to the sonotrode 20. The sonotrode 20 transmits and spreads the acoustic wave to its rigid surface 22. Ideally, the booster is positioned relative to the sonotrode 20, and its rigid surface 22, so that the vibration direction is normal to the rigid surface.

The rigid surface 22 vibrates in response to the acoustic waves spreading over the rigid surface. For the best efficiency, the vibration motion can be normal or close to normal to the surface of the sonotrode. It is also important that the vibration pattern be as uniform or even as possible. When the heated glass 11 is positioned within a near field region of the vibrating rigid surface 22, a gas squeeze film is created between the heated glass and the rigid surface which generates a levitation force (pressure) that levitates the heated glass. The levitation force that is generated depends on the squeeze number ε: the ratio between the amplitude, a, of the vibration and the flying height $h_0$ of the levitating object, in accordance with the following equation:

$$\varepsilon = \frac{a}{h_0}$$

The load force needed to levitate the heated glass depends in part on the size and weight of the heated glass. Sufficient load forces can be generated when the vibration source operates to provide acoustic waves having an operating frequency in the range of about 5,000 to about 2,000,000 Hz, alternatively in the range of 20,000 to 50,000 Hz, with an amplitude in the range of about 1 µm to about 200 µm.

Figure 2:
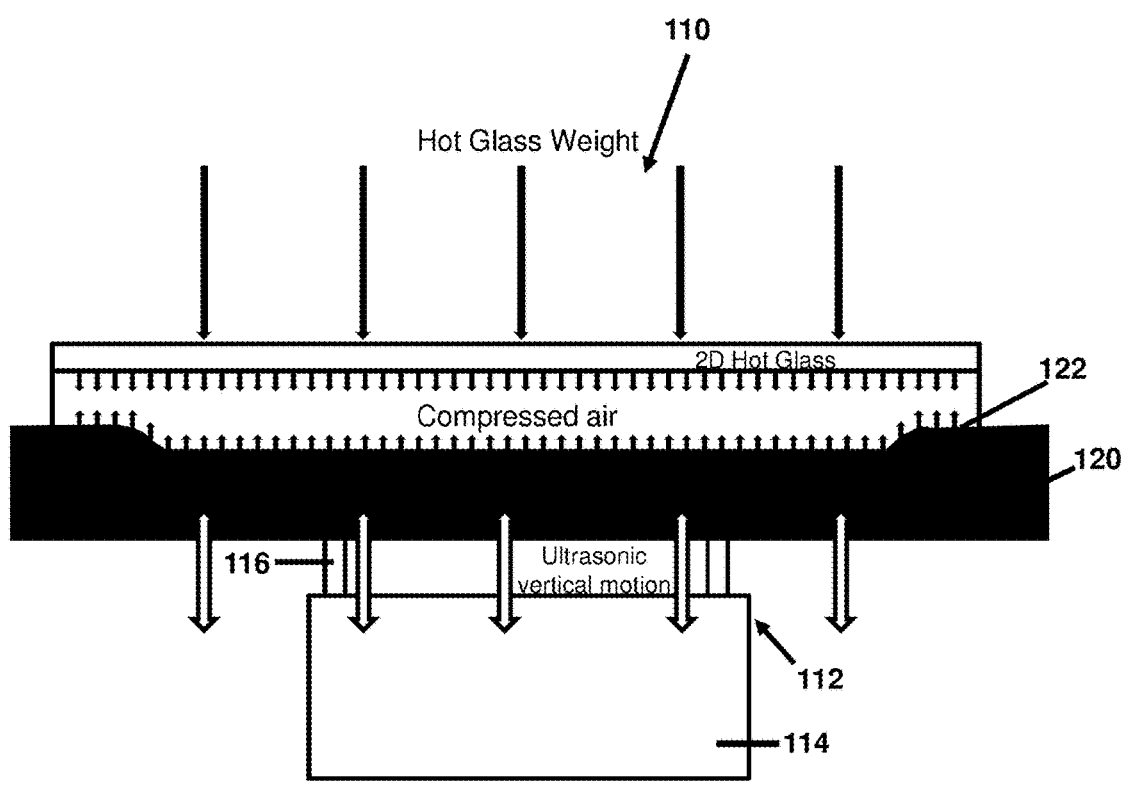
FIG. 2 is a side view of a system for reforming heated glass in a mold using near field acoustic levitation.

FIG. 2 illustrates a further embodiment of a system 110 for levitating heated glass. In this embodiment, the system 110 uses acoustic levitation to form heated glass into a particular shape, such as, for example, a three dimensional shape or a thin, flat sheet. The system includes a vibration source 112 coupled to a sonotrode acting as a mold 120 that has a rigid surface 122 for forming the glass into a desired shape. The vibration source 112 includes a transducer 114, which incorporates any suitable transducer element or elements, such as a piezoelectric or magnetostrictive element or elements, that transform electrical current into small displacements. The vibration source 112 further includes a booster 116 to amplify the vibrations generated by the transducer. The booster 116 is operatively coupled to the sonotrode 120 which, in this embodiment, acts as a mold. The sonotrode transmits and spreads the vibrations to the mold surface 122.

The vibration source 112 is positioned relative to the mold surface 122 so that the vibration direction is normal to the mold surface. It is also important that the vibration pattern be as uniform and as evenly distributed as possible over the mold surface in order to accurately shape the heated glass in the shape of the mold surface 122. In one aspect of this embodiment, the vibration source generates a vibration pattern having an amplitude of about 15 µm with a variation of no more than about 2 µm.

The mold can be made from a variety of materials, such as, for example, quartz glass, silicon carbide, zirconia, stainless steel, and titanium alloys. Suitable mold materials should be stable at the temperatures required for forming the glass, for example up to 1000° C., 1500° C., or more, have a low density, and a stable and high Young's modulus value at temperatures up to 1000° C. Typical Young's modulus values are in the range of 50 to 3000 Gpa. In addition, the mold materials should have a low loss tangent factor, and have the ability to be machined or shaped with a high accuracy and be polished at a low level of roughness (Ra<0.8). Ideally, the mold material should also have a low affinity with the glass.

In operation, the vibration source 112 is energized, for example, by supplying an electric current to the transducer 114. The transducer 114 generates an acoustic wave that is transmitted through the booster 116 to the rigid surface 122 of the sonotrode (mold) 120. The acoustic wave could be vibratory, ultrasonic, or megasonic. The mold surface 122 vibrates in response to the acoustic waves spreading over the mold surface. The glass is introduced into the near field region of the vibrating mold surface 122. In one aspect of this embodiment, the glass is close to or above its softening point temperature so that its viscosity will be low enough for the glass to sag on its own weight. As the glass sags toward the mold surface 122, a gas squeeze film is created between the heated glass and the mold surface which generates a levitation force (pressure) that levitates the heated glass. The gravitational forces acting on the glass will be sufficient to allow the gas squeeze film to equilibrate. As the mold surface continues to vibrate, the heated glass takes the shape of the mold, but the levitation force acting on the glass prevents the glass from contacting the mold surface.

In one aspect of the FIG. 2 embodiment, the heated glass cools in the mold mainly through radiation. At a selected cooler glass temperature, the acoustic wave is reduced or stopped, allowing the molded glass to contact the mold without damage. Since the mold surface is at a lower temperature than the glass, the temperature of the glass will quickly be reduced by conduction. Alternatively, the heated glass and the mold can be cooled together until the temperature of the glass is cool enough that the glass becomes stiff and can be released from the mold without damage.

Figure 3:
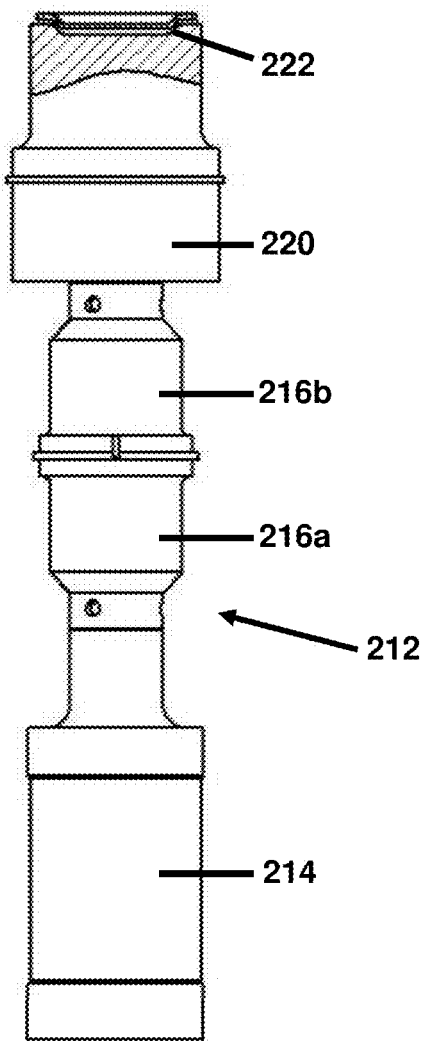
FIG. 3 is a side view, partially cut away, of one embodiment of the FIG. 2 system.

A specific example of the FIG. 2 embodiment is shown in FIG. 3. In this example, a vibration source 212 comprises a transducer 214, which incorporates any suitable transducer element or elements, operatively coupled to boosters 216a and 216b. The boosters 216a and 216b are operatively coupled to a sonotrode 220, and transmit an acoustic wave generated by the transducer 214 to the sonotrode 220. The sonotrode 220 has a mold surface 222 which vibrates in response to the acoustic waves spreading over the mold surface 222. The sonotrode 220 and the mold surface 222 can be formed from a variety of materials, such as any of the materials recited above for the FIG. 2 embodiment.

Heated glass is introduced into the near field region of the vibrating mold surface 222 and sags on its own weight due to gravitational forces. As the heated glass sags toward the mold surface 222, a gas squeeze film is created between the heated glass and the mold surface which generates a levitation force that levitates the heated glass. The gravitational forces acting on the glass will be sufficient to allow the gas squeeze film to equilibrate. As the mold surface continues to vibrate, the heated glass takes the shape of the mold, but the levitation force acting on the glass prevents the glass from contacting the mold.

Figure 4:
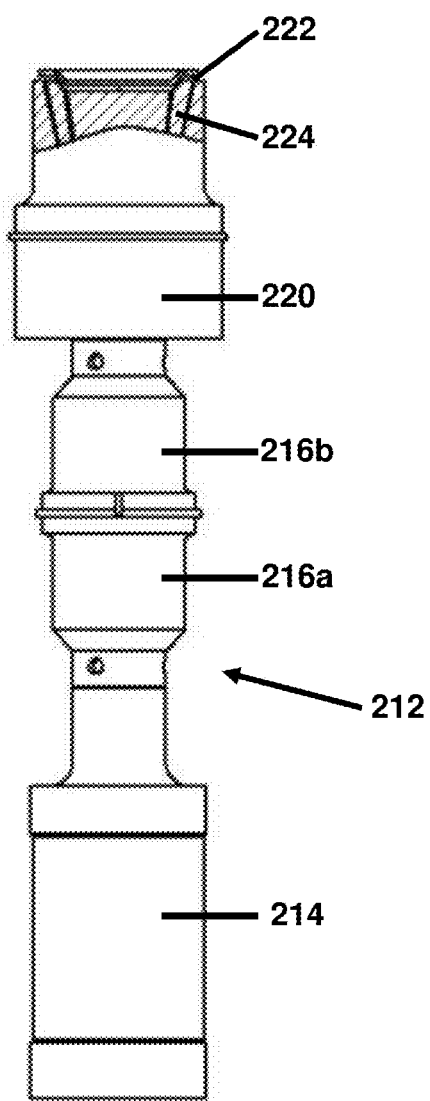
FIG. 4 is a side view, partially cut away, of the FIG. 3 embodiment combined with vacuum.

To enhance the gravitational forces acting on the heated glass, orifices, such as vacuum holes 224, can be provided in the sonotrode 220, as shown in FIG. 4. When a negative pressure (vacuum) is generated at the vacuum holes, the negative pressure acts on the bottom surface of the heated glass and increases the load force acting on the glass. Suitable vacuum pressures range from about −10 mbar to about −500 mbar.

Figure 5:
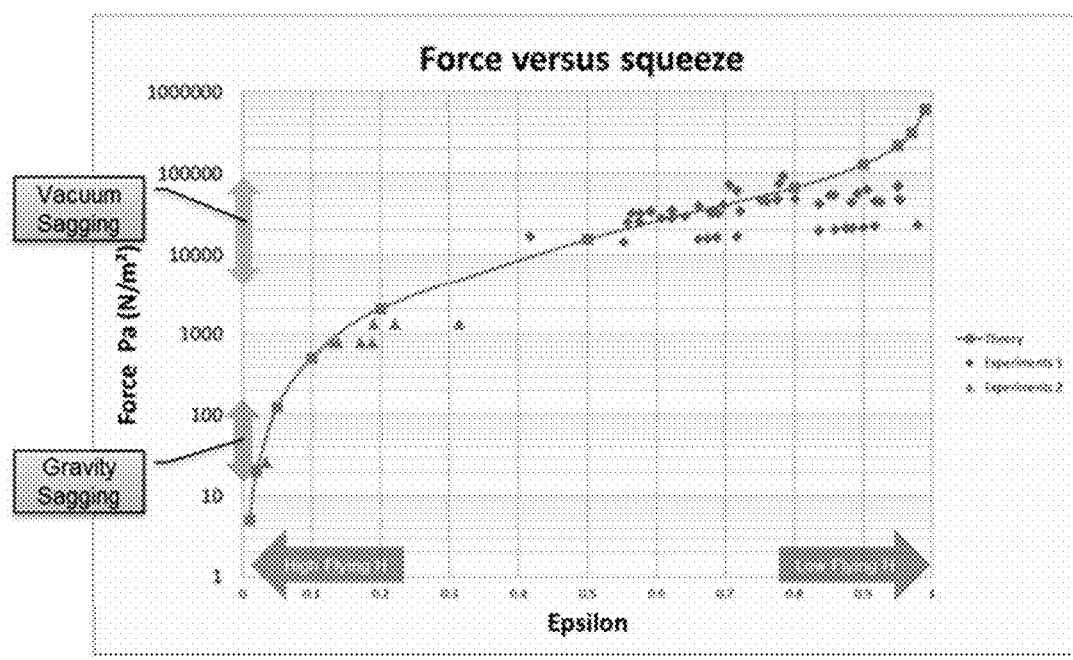
FIG. 5 is a graph plotting loading force versus squeeze number.

The effect of adding vacuum pressure on the gas squeeze film can be seen in the graph shown in FIG. 5. Theoretically, the load force tends to an infinite value as $a/h_0 \to 1$, and the distance between the mold surface and the heated glass approaches 0. The lower the flying height $h_0$, the thinner the gas squeeze film and the more force is generated to shape the heated glass into the shape of the mold surface. Generating a negative pressure from the vacuum holes advantageously allows for a more rapid formation and equilibration of the gas squeeze film as well as a thinner gas squeeze film and a lower flying height for the glass. One of skill in the art will appreciate that vacuum holes could also be provided in the mold 120 in the FIG. 2 embodiment to enhance the gravitational forces acting on the heated glass.

Figure 6:
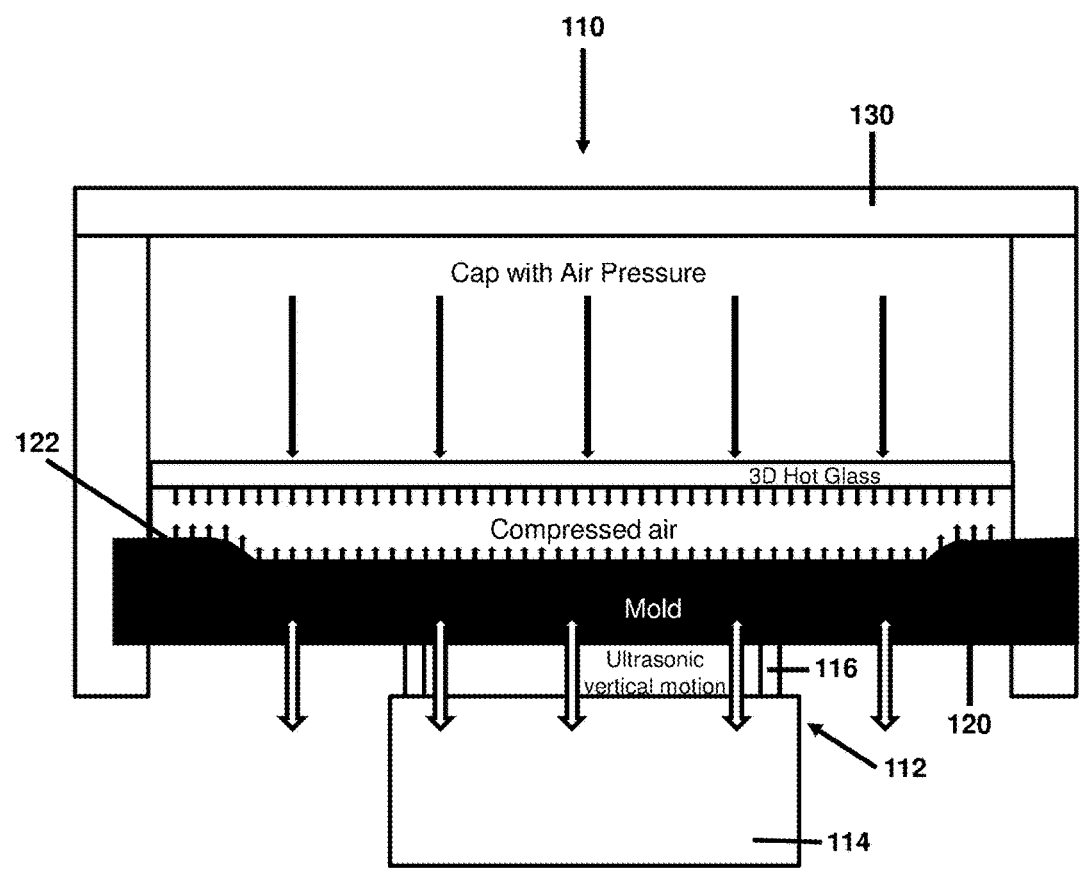
FIG. 6 is a side view of the system of FIG. 2 incorporating a pressure cap.
Figure 7:
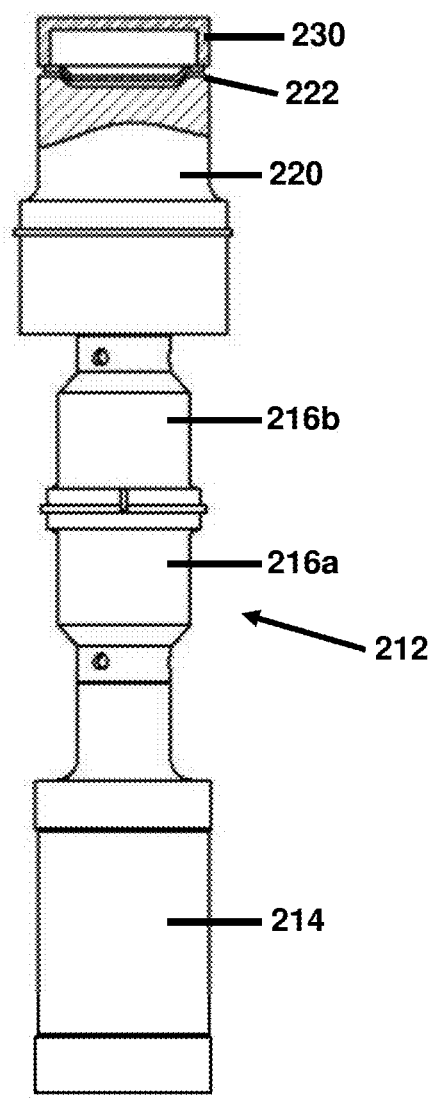
FIG. 7 is a side view, partially cut away, of the FIG. 3 embodiment incorporating a pressure cap.

As an alternative to providing vacuum holes in the mold to generate a negative pressure, a pressure cap can be placed over the mold to provide a source of air pressure acting on the top surface of the heated glass. This alternative is shown in FIG. 6 for the FIG. 2 embodiment and FIG. 7 for the FIG. 3 embodiment. The pressure cap (130 in FIG. 6, 230 in FIG. 7) can be made from the same materials that can be used for the mold, such as, for example, quartz glass, silicon carbide, zirconia, stainless steel, and titanium alloys. The pressure source can be any gas, but typically will be air or nitrogen. Typical pressures provided by the cap range from 10 to 1000 mbar. The additional pressure supplied by the pressure cap allows faster forming speeds to be attained due to faster equilibration of the gas squeeze film and a thinner squeeze film. The pressure cap also allows a higher viscosity glass (and thus a lower temperature system) to be used in the formation process.

Figure 8:
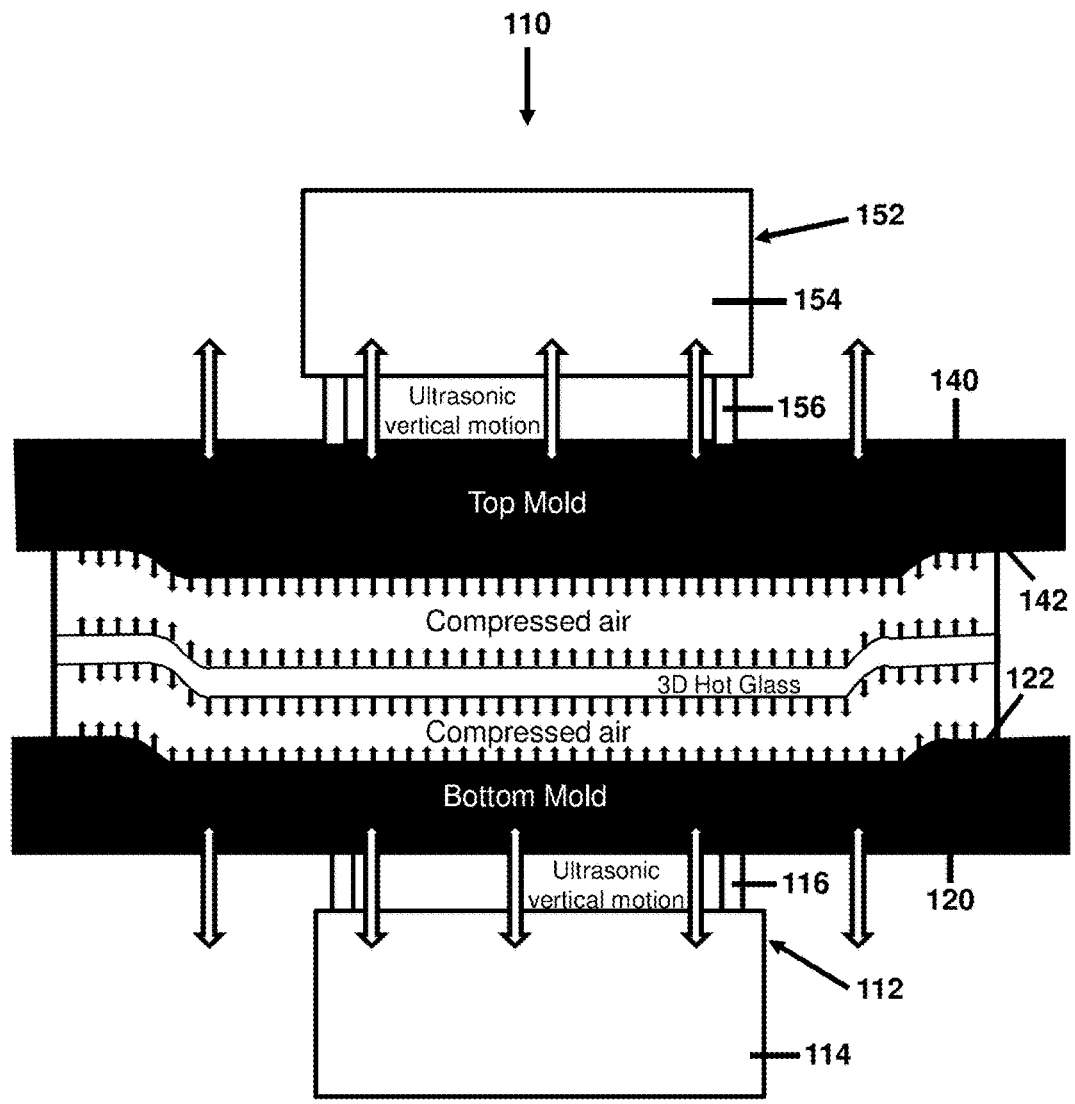
FIG. 8 is a side view of the system of FIG. 2 incorporating a top mold.
Figure 9:
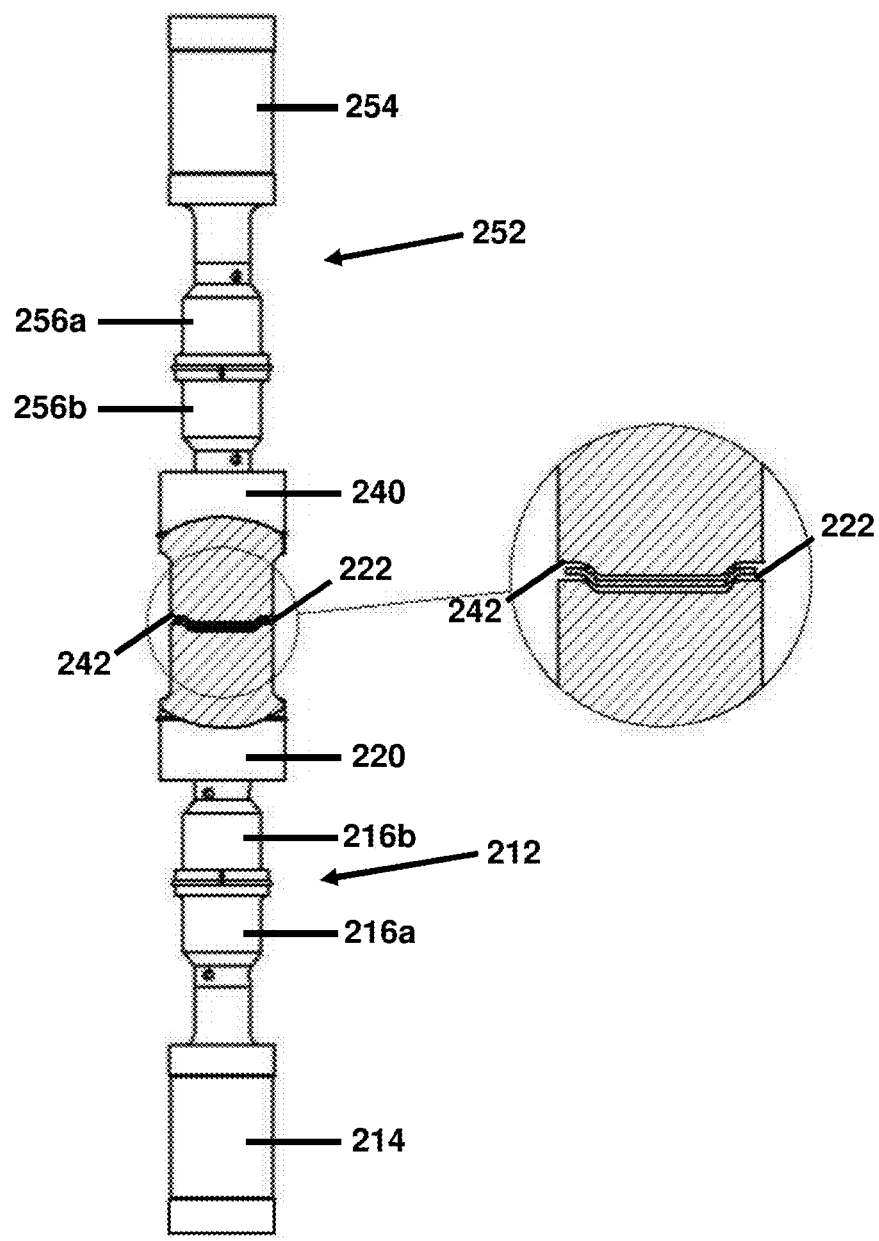
FIG. 9 is a side view, partially cut away, of the FIG. 3 embodiment incorporating a top mold.

A further alternative to the FIG. 2 and FIG. 3 embodiments is shown in FIGS. 8 and 9. Rather than a pressure cap, in this alternative, the system has an upper sonotrode acting as an upper mold (140 in FIG. 8, 240 in FIG. 9) which is placed over the sonotrode (120 in FIG. 8, 220 in FIG. 9). The upper sonotrode has a rigid surface (142 in FIG. 8, 242 in FIG. 9) and is coupled to a vibration source (152 in FIG. 8, 252 in FIG. 9), which includes a transducer (154 in FIG. 8; 254 in FIG. 9) and a booster (156 in FIG. 8; 256 a and b in FIG. 9). The transducer incorporates any transducer element or elements, such as a piezoelectric or magnetostrictive element or elements that transform electrical current into small deplacements. The booster or boosters (156 in FIG. 8; 256a and b in FIG. 9) maintain or amplify the vibrations generated by the transducer. The booster (156 in FIG. 8; 256a and b in FIG. 9) is operatively coupled to the upper sonotrode (140 in FIG. 8; 240 in FIG. 9) which acts as a upper mold or plunger in this embodiment. The vibrations generated by the transducer are transmitted to and spread by the upper mold (sonotrode) (140 in FIG. 8; 240 in FIG. 9) to the rigid surface (142 in FIG. 8; 242 in FIG. 9).

In operation of this alternative embodiment, heated glass is positioned atop the mold surface (122 in FIG. 8; 222 in FIG. 9), which is vibrating due to the acoustic wave being transmitted and spread over the mold surface. The glass levitates and then starts to sag in the middle. At the same time, the upper mold (sonotrode) (140 in FIG. 8; 240 in FIG. 9), which is also vibrating due to the acoustic wave being spread over the upper mold surface (142 in FIG. 8; 242 in FIG. 9), is lowered toward the mold (120 in FIG. 8; 220 in FIG. 9). As the upper mold is lowered, the glass comes closer to the upper mold surface (142 in FIG. 8; 242 in FIG. 9) but does not contact the upper mold surface because of the gas squeeze film that is created between the glass and the vibrating upper surface. As the upper mold continues to be lowered, the gas squeeze film between the upper mold surface (142 in FIG. 8; 242 in FIG. 9) and the top surface of the glass, and the gas squeeze film between the mold surface (122 in FIG. 8; 222 in FIG. 9) and the bottom surface of the glass, equilibrate so that there is an even gas squeeze film throughout the glass shape being formed and both mold surfaces. During forming, the glass is cooling mainly through radiation and the final forming features are established. At a selected cooler temperature, the vibration sources (112 and 152 in FIGS. 8; 212 and 252 in FIG. 9) are slowed or stopped, causing the formed glass to contact the cooler mold surface (122 in FIG. 8; 222 in FIG. 9) without damage. The temperature of the formed glass then further cools as a result of contact with the cooler mold surface. Alternatively, the heated glass and both the lower mold (120 in FIG. 8; 220 in FIG. 9) and the upper mold (140 in FIG. 8; 240 in FIG. 9) can be cooled together until the temperature of the glass is cool enough that the glass becomes stiff and can be released from the mold without damage.

As an alternative to any of the embodiments disclosed above, the glass introduced into the near field region can be in a preform shape. The glass can be at a temperature below its softening point and heated to close to or above its softening point after being levitated. Alternatively, the glass can be heated such that only selected portions are heated to close to or above the softening point of the glass, while other portions remain below the softening point. Such selective heating of portions of the glass allows the glass to be selectively shaped at the heated portions while minimizing deformations, since the remainder of the glass remains rigid. Heating elements can be provided in or adjacent to the sonotrode (mold) to accomplish the heating or selective heating of the glass. Contemplated heating methods include inductive, conductive, convective, and radiation methods.

Figure 10:
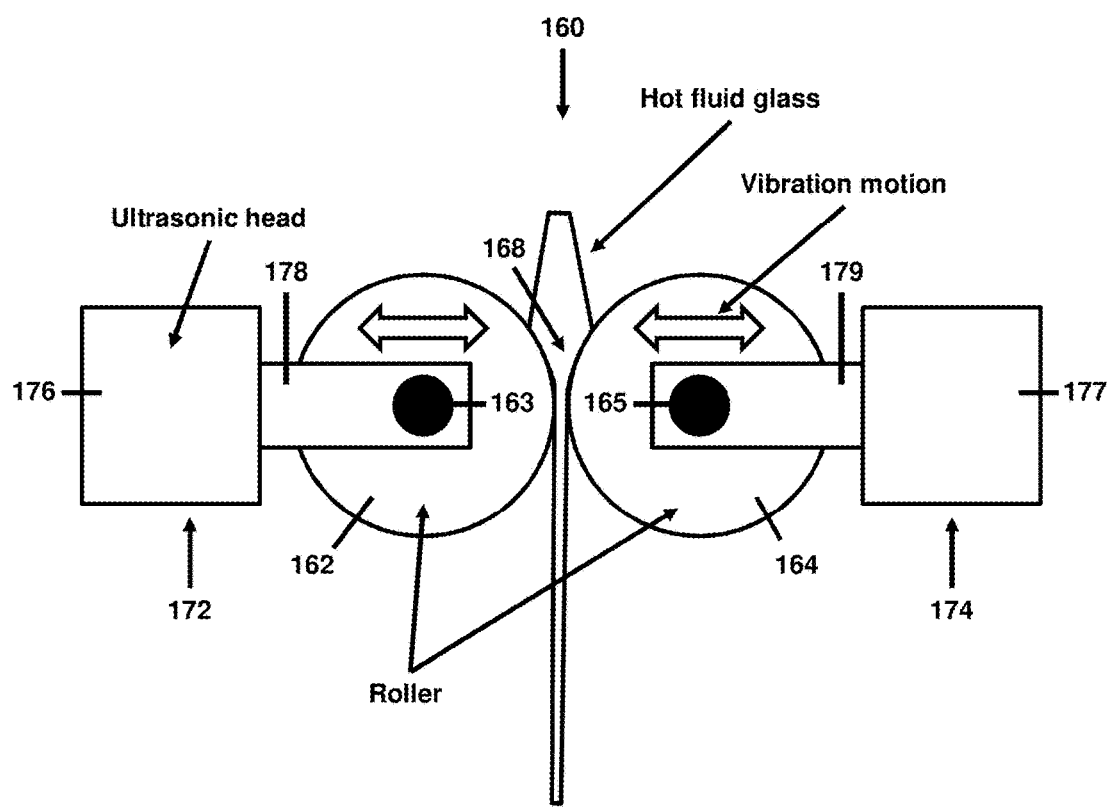
FIG. 10 is a side view of an alternative embodiment of a system for forming heated glass using near field acoustic levitation.
Figure 11:
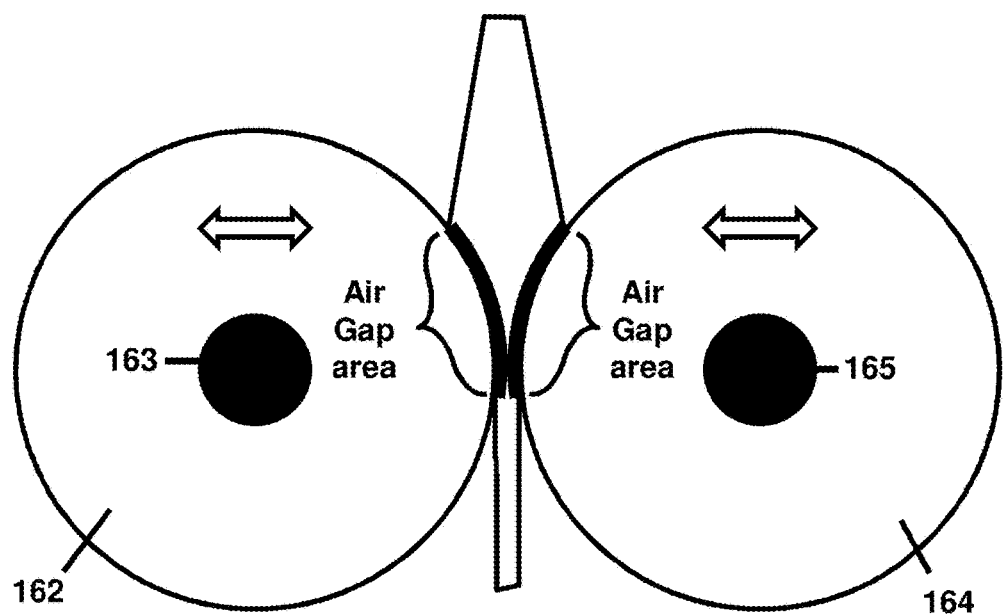
FIG. 11 is an enlargement of a portion of the system of FIG. 10.

FIGS. 10 and 11 illustrate a further embodiment of a system 160 for forming heated glass using the principle of near-field acoustic levitation. The system 160 includes two sonotrodes 162 and 164 positioned in a common horizontal plane and that act as rollers. Sonotrode (roller) 162 rotates about an axis 163, and sonotrode (roller) 164 rotates about an axis 165 in a direction opposite that of roller 162. The sonotrodes 162 and 164 are spaced apart to provide a gap 168 for receiving hot fluid glass.

A vibration source 172 is coupled to the sonotrode (roller) 162, and a vibration source 174 is coupled to the sonotrode (roller) 164. The vibration sources 172 and 174 each include a transducer 176, 177, respectively, operatively coupled to an acoustic transformer 178, 179, respectively. The transducers incorporate any suitable transducer element or elements, such as a piezoelectric or magnetostrictive element or elements. When energized, the transducers 176, 177 generate acoustic waves that are transmitted through the acoustic transformers 178, 179, respectively, to the sonotrodes (rollers) 162, 164, respectively, causing the surfaces of the sonotrodes to vibrate in a horizontal direction. As hot fluid glass is metered onto the rotating sonotrodes 162, 164, it forms a glass puddle at the gap 168. Rotation of the sonotrodes causes the glass to spread out into a wide thin sheet. At the same time, the horizontal vibrations of the sonotrode surfaces cause a gas squeeze film to be created between the glass and the sonotrode surfaces, as shown in further detail in FIG. 11. The gas squeeze film generates a pressure that levitates the glass so that the glass does not contact the surfaces of the sonotrodes 162, 164. As used in connection with this embodiment, the term "levitates" means that the glass is pushed away from the roller surface.

Depending upon the viscosity of the heated glass, the gravitational forces acting on the glass may be insufficient to form the glass into a wide thin sheet. If the gravitational forces are insufficient, an additional pulling force can be generated which acts downstream on the glass. The pulling force can be generated by providing rollers, treads, or another device to pull the glass at a point where it has cooled sufficiently such that contact with the glass will not cause deformations.

Figure 12:
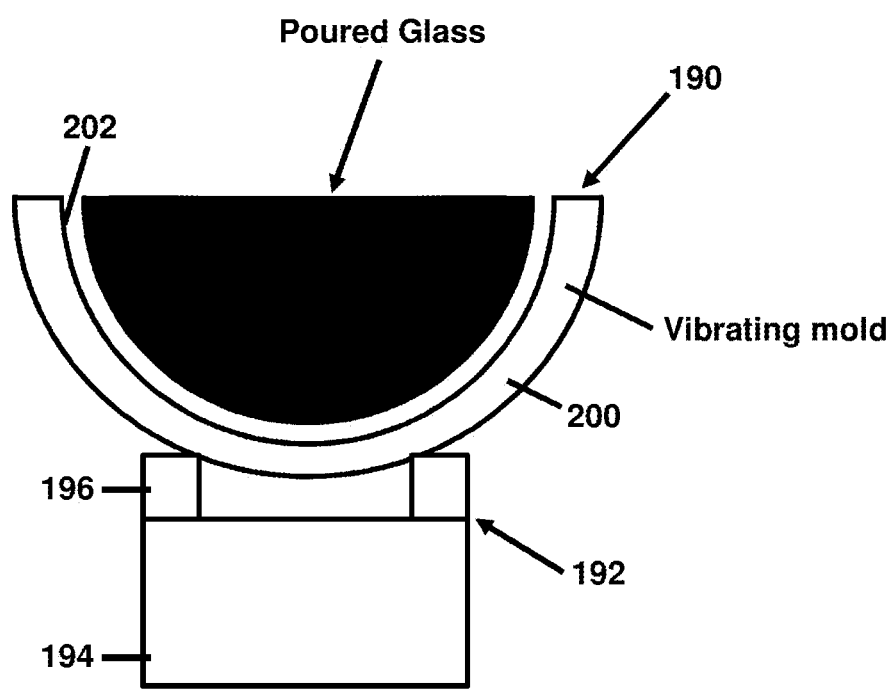
FIG. 12 is a side view of a system for molding molten glass using near field acoustic levitation.

FIG. 12 illustrates a further embodiment of a system for levitating heated glass using near field acoustic levitation. In this embodiment, a system 190 uses acoustic levitation to cast a fluid (hot) glass. The system 190 includes a vibration source 192 coupled to a mold 200 having a rigid surface 202 for casting the glass into a desired shape, such as a 3-dimensional shape. The vibration source 192 includes a transducer 194, which incorporates any suitable transducer element or elements, and a booster 196 to amplify the vibrations generated by the transducer. The booster 196 is operatively coupled to the mold 200, which transmits and spreads the vibrations to the mold surface 202.

In operation, the transducer 194 is energized, for example, by supplying an electric current, and generates an acoustic wave that is transmitted through the booster 196 to the rigid surface 202 of the mold 200. The acoustic wave could be vibratory, ultrasonic or megasonic. The mold surface 202 vibrates in response to the acoustic waves spreading over the mold surface. When the hot glass is introduced into the near field region of the vibrating mold surface 202, a gas squeeze film is created between the heated glass and the mold surface 202 which generates a levitation force that levitates the heated glass. As the mold surface continues to vibrate, the heated glass takes the shape of the mold, but the levitation force acting on the glass ensures that the glass does not contact the mold surface. The heated glass cools mainly through radiation as it is being cast into the desired shape. At a selected cooler glass temperature, the acoustic wave is reduced or stopped, allowing the cast glass to contact the mold surface without damage. Since the mold surface is at a lower temperature than the glass, the temperature of the glass will be reduced through conduction. Alternatively, the heated glass and the mold can be cooled together until the temperature of the glass is cool enough that the glass becomes stiff and can be released from the mold without damage.

Using near field acoustic levitation to levitate heated glass offers several advantages over prior art methods for transporting, forming or casting heated glass. Compared to conventional air bearing methods for transporting heated glass, the present transporting system and method provides a homogenous and even pressure distribution below the glass surface which can minimize stress defects. The present system also avoids contamination that can come from the bearing air or from the material the bearing air is passing through, thereby minimizing surface defects that such contamination can cause. In addition, the present system avoids the formation of pin-point, imprint, or other stress patterns due to the bearing air blowing on the glass surface.

Compared to conventional forming or casting heated glass, the present systems and methods for forming or casting heated glass provides several advantages. Since the heated glass does not contact the mold during forming, there is less interaction between the glass and the mold, which minimizes or eliminates scratches and other cosmetic defects in the glass, and stressing in the glass. In addition, less interaction between the glass and the mold also reduces wear on the mold, thereby extending the life of the mold.

It will be apparent to those skilled in the art that various modifications and variations can be made without departing from the spirit and scope of the embodiments, which is defined by the appended claims. In particular, although the embodiments have been described herein with particular reference to a heated glass, it should be appreciated that the embodiments need not be limited to a heated glass, but rather, may be practiced with other softened, viscous, or viscoelastic materials.

The invention claimed is:

1. A method for shaping a material into a final form shape using acoustic waves, comprising the steps of:
   a. providing a softened, viscous, or viscoelastic material, or a material having a preform shape;
   b. providing a support structure having a rigid surface, and a vibration generator operatively connected to the rigid surface;
   c. generating and transmitting acoustic waves from the vibration generator to the rigid surface, at a frequency and an amplitude sufficient to vibrate the rigid surface and thereby create a gas squeeze film adjacent the rigid surface, the gas squeeze film having a pressure greater than ambient air pressure; and
   d. levitating the material with the pressure generated by the gas squeeze film such that the material does not contact the rigid surface;
   wherein the gas squeeze film and load forces acting on the material are sufficient to change the material to a final form shape.

2. The method of claim 1, wherein the support structure comprises a mold for reforming or casting the material.

3. The method of claim 2, further comprising the steps of providing a pressure cap over the mold and generating a pressure for at least part of the time the material is levitated such that the pressure acts on the material on a side opposite that of the mold.

4. The method of claim 1, wherein the support structure comprises one or more orifices for controlling air pressure in the gap.

5. The method of claim 1, further comprising the step of applying a pressure to the material for at least part of the time it is levitated.

6. The method of claim 1, wherein the material is selectively heated prior to or during the levitation step.

7. The method of claim 1, wherein the support structure comprises two rollers rotating in a common horizontal plane and spaced apart such that the surfaces of the rollers provide a gap through which the material can flow, each roller having a vibration generator associated therewith and operatively connected to the roller surface such that the roller surfaces vibrate in a horizontal direction and thereby create a gas squeeze film adjacent to each roller surface, and wherein the pressure generated in the gas squeeze film levitates the material away from the roller surfaces so that the material does not contact the roller surfaces.

8. The method of claim 1, wherein the frequency is about 5,000 to about 2,000,000 Hz.

9. The method of claim 1, wherein the amplitude is about 1 micron to about 200 microns.

10. The method of any claim 1, wherein the vibration generator comprises a transducer for generating the acoustic waves and a booster configured to spread the acoustic waves to the rigid surface.

11. The method of claim 1, further comprising the step of providing a vacuum force that acts on the material and balances the pressure generated by the gas squeeze film.

12. The method of claim 1, wherein the softened, viscous, or viscoelastic material is a heated glass which is at least at its glass transition temperature prior to levitation.

13. A system for shaping a softened, viscous, or viscoelastic material comprising:
   at least one support structure having a rigid surface; and
   at least one vibration generator operatively connected to the rigid surface for generating and transmitting acoustic waves from the vibration generator to the rigid surface, wherein the vibration generator operates at a frequency and at an amplitude sufficient to vibrate the rigid surface and thereby create a gas squeeze film, wherein the gas squeeze film has a sufficient pressure to levitate and shape the material.

14. The system of claim 13, wherein the support structure comprises a mold for reforming or casting the material.

15. The system of claim 14, further comprising a pressure cap disposed over the mold, wherein the pressure cap generates an air pressure that acts on the material on a side opposite that of the mold.

16. The system of claim 13, wherein the support structure comprises two rollers rotating in a common horizontal plane and spaced apart such that the surfaces of the rollers provide a gap through which the material can flow, each roller having a vibration generator associated therewith and operatively connected so that the roller surfaces vibrate in a horizontal direction, thereby creating a gas squeeze film adjacent at least a portion of each roller surface, and wherein the pressure generated by the gas squeeze film levitates the material such that the material does not contact the roller surfaces.

17. The system of claim 16, wherein the vibration generator comprises a transducer and an acoustic transformer, and the rollers each comprise a sonotrode.

18. The system of claim 13, wherein the vibration generator comprises a transducer for generating the acoustic waves, and a booster configured to spread the waves to the rigid surface.

19. The system of claim 13, wherein the support structure is a bottom mold for reforming or casting material, and the system further comprises:
   a top mold disposed over the bottom mold; and
   at least one vibration generator operatively connected to the top mold for generating and transmitting acoustic waves from the vibration generator to the top mold, wherein the vibration generator connected to the top mold operates at a frequency and an amplitude sufficient to vibrate the top mold and create a gas squeeze film between the top mold and the material.

20. The system of claim 13, wherein the softened, viscous, or viscoelastic material is a heated glass which is at least at its glass transition temperature.

21. The system of claim 20, wherein the rigid surface of the support structure has a temperature that is lower than that of the heated glass.

22. The system of claim 13, wherein the support structure comprises one or more orifices for controlling air pressure.

23. The system of claim 13, wherein the support structure comprises a sonotrode.

* * * * *

UNITED STATES PATENT AND TRADEMARK OFFICE
CERTIFICATE OF CORRECTION

PATENT NO. : 10,407,335 B2  
APPLICATION NO. : 15/522140  
DATED : September 10, 2019  
INVENTOR(S) : Jean-Luc Dabouineau et al.

Page 1 of 1

It is certified that error appears in the above-identified patent and that said Letters Patent is hereby corrected as shown below:

On the Title Page

Item [57], Line 1, delete "viscous" and insert -- viscous, --, therefor.

Page 2, Item [56], Line 2, delete "Schilip" and insert -- Schilp --, therefor.

Page 2, Item [56], Line 10, delete "12011009447" and insert -- 2011009447 --, therefor.

In the Claims

Column 9, Line 51, Claim 10, delete "of any claim 1," and insert -- of claim 1, --, therefor.

Signed and Sealed this  
Fourteenth Day of July, 2020

Andrei Iancu  
*Director of the United States Patent and Trademark Office*